United States Patent [19]

Kaufman

[11] 4,015,220
[45] Mar. 29, 1977

[54] FREQUENCY SHIFT KEYED TONED GENERATOR

[75] Inventor: Barry M. Kaufman, Pine Brook, N.J.

[73] Assignee: R F L Industries, Inc., Boonton, N.J.

[22] Filed: Nov. 3, 1975

[21] Appl. No.: 628,568

[52] U.S. Cl. .............................. 331/179; 328/24; 328/127; 330/109; 331/49; 331/51; 332/26

[51] Int. Cl.$^2$ .......................................... H03C 3/06

[58] Field of Search ............... 331/179, 49, 51, 56; 330/109; 328/127, 22, 25; 332/26, 16 T

[56] References Cited

UNITED STATES PATENTS

| | | | |
|---|---|---|---|
| 3,028,551 | 4/1962 | Secretan | 328/22 |
| 3,529,260 | 9/1970 | Noyes, Jr. | 331/77 |
| 3,719,897 | 3/1973 | Tarr | 331/51 |
| 3,752,922 | 8/1973 | Burke | 332/26 |
| 3,760,289 | 9/1973 | Hurtig | 330/109 |

Primary Examiner—John Kominski
Attorney, Agent, or Firm—Rudolph J. Jurick

[57] ABSTRACT

A frequency shift keyed (FSK) generator producing an output frequency which is determined by gating through a selected one of a plurality of crystal controlled oscillators. The oscillator output is divided by a digital frequency divider to the operating tone frequency. The square wave output of the divider is filtered to a sinewave by an active tracking bandpass filter which is instantaneously switched to the operating frequency simultaneously with the selection of the appropriate crystal controlled oscillator.

2 Claims, 2 Drawing Figures

FREQUENCY SHIFT KEYED TONED GENERATOR

BACKGROUND OF THE INVENTION

Frequency shift keying of an audio tone is a well known method of transmitting data. In general, the tone frequency is generated by an LC or RC oscillator which produces a relatively clean sinewave and, if the circuit is designed accordingly, amplitude can be made to remain fairly constant and there will be no phase discontinuities. Also, the time delay between keying the oscillator and the time that the frequency actually shifts can be made extremely short. However, there is a limit to the frequency accuracy of an LC or an RC oscillator, particularly with respect to temperature and time.

A quartz crystal controlled oscillator has a very high frequency accuracy and frequency stability versus age and environmental conditions. Crystals operating in the audio frequency range are bulky and expensive, whereas crystal operating in the megahertz range are inexpensive, readily available, small and highly accurate.

In accordance with this invention, high frequency crystal controlled oscillators are operated continuously, there being one oscillator for each of the FSK frequency states or levels to be generated. These oscillators are gated, one at a time, to the input of a digital frequency divider whose output is the required tone frequency. Since the data input may be asynchronous, and the gating circuits and digital frequency divider are zero crossing devices, there will be a time error at crystal frequency if the frequency is commanded to shift non-coincident with a zero crossing of the oscillator frequency. However, the state of the art now is such that 5–10 megahertz crystal oscillators are practical using C-MOS logic so that the time error is of the order of a few hundred nano seconds, which is insignificant at the final audio tone frequency. This time error refers to the error between zero crossings at the input of the digital frequency divider. The zero crossings at the output, however, will not necessarily occur simultaneously with a command to shift frequency. Therefore, there can be an asynchronous timing error which for some systems may be substantial. The timing error or asynchronous delay can be ½ cycle of the divider output frequency. If the FSK detection means at the receiving end of the communications channel is responsive only to zero crossings, then the switched crystal controlled oscillators and the digital frequency divider will not increase the asynchronous timing error above that already generated by the said zero crossing detection means. Theoretically, it is possible by use of a continuous phase FSK demodulator at the receiver to have no asynchronous timing error. However, the output of such a perfect demodulator changes when the rate of change of phase of the incoming signal changes. Continuous phase information over the entire tone frequency cycle is not available from zero crossings alone. Tone generation, transmission and detection of a sinewave is required. Because the crystal frequencies are digitally divided down to tone frequency, a squarewave is generated. The use of a continuous phase discriminator at the receiving end would not improve the asynchronous timing error.

The use of switched crystal controlled oscillators with subsequent frequency division down to audio tone frequency is not new. The invention is directed to the solution of problems inherent in such systems. Specifically, a continuous phase signal is generated by processing the output of the digital frequency divider through an active tracking bandpass filter. The rate of change of phase of the output signal changes virtually instantaneously when the circuit is shifted from one oscillator to another. Therefore, the combination of digital tone generation and tracking active bandpass filter produces no asynchronous timing error and the signal is suitable for reception at the receiving end of the system by either continuous phase FSK detection means or zero crossing FSK detection means.

SUMMARY OF THE INVENTION

A plurality of high frequency crystal controlled oscillators are operated continuously, there being one oscillator for each of the FSK frequency states to be generated. The oscillators are switched, one at a time, to the input of a digital frequency divider whose output is the required tone frequency. The output of the divider is applied to a narrow bandwidth tracking filter providing a continuous phase output signal, the rate of change of phase of the output signal changing virtually instantaneously when the circuit is shifted from one oscillator to another.

An object of this invention is the provision of an improved arrangement for generating an FSK tone signal suitable for reception at the receiving end of a communications channel by either continuous phase FSK detection means or by zero crossing FSK detection means.

An object of this invention is the provision of an FSK tone generator having crystal controlled frequency stability and tolerance, and virtually no time delay between the command to shift frequency and the time when the output frequency actually changes.

An object of this invention is the provision of an FSK tone generator providing a pure sinewave output with no change in amplitude and no discontinuity of phase when frequency is shifted.

An object of this invention is the provision of an FSK tone generator in which the frequencies of crystal controlled oscillators are divided down to audio tone frequencies by a digital frequency divider whose output is processed by a tracking active bandpass filter to provide a sinewave output.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
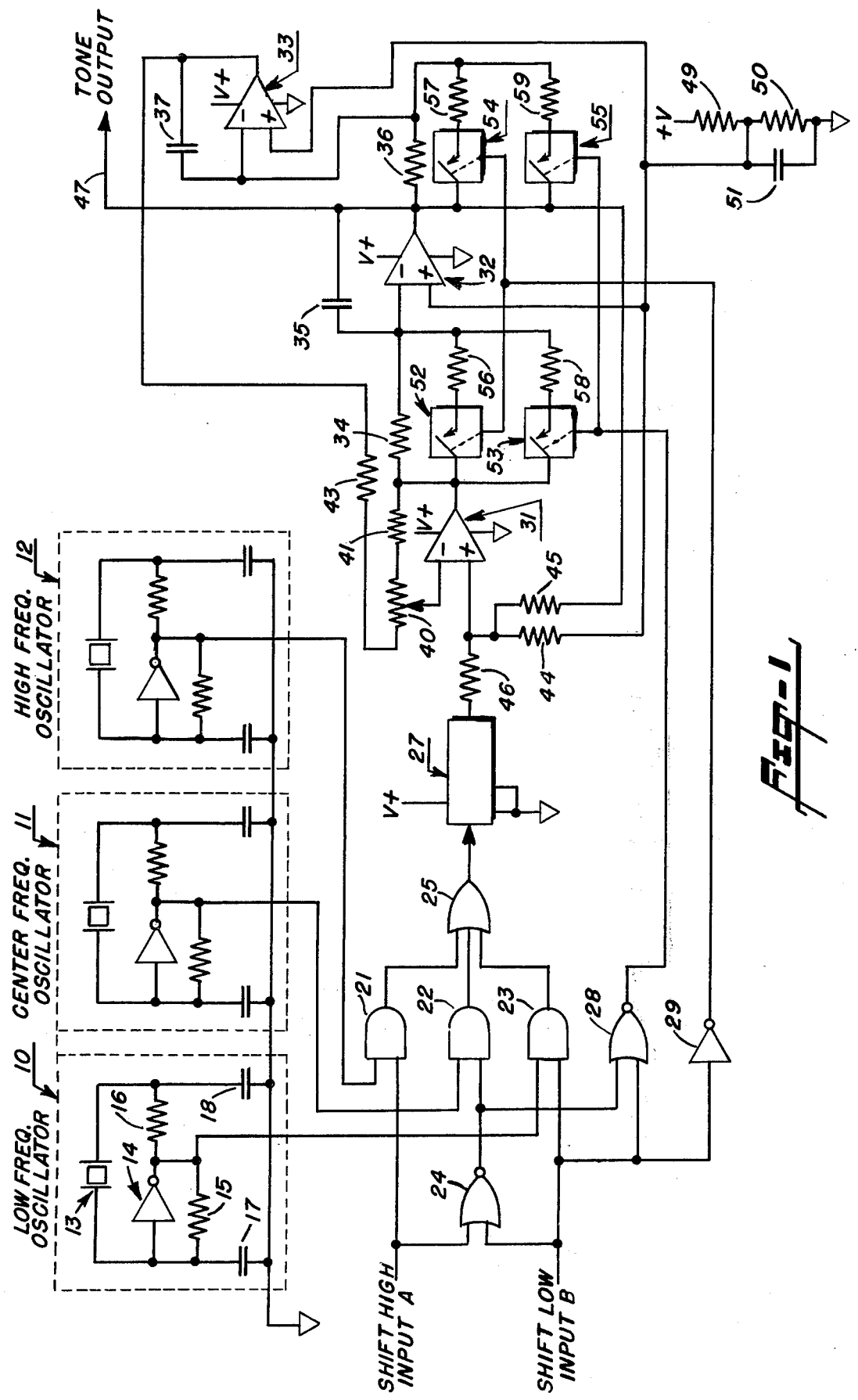
FIG. 1 is a schematic circuit diagram of a 3-frequency, FSK tone generator made in accordance with this invention.

Reference now is made to FIG. 1 showing three crystal controlled oscillators 10, 11 and 12, which oscillators are all identical except for crystal frequency so only one of them will be described. Referring to oscillator 10, the crystal 13 oscillates at its fundamental frequency in a modified culpits oscillator circuit using a C-MOS inverter 14 as the active amplifying element. The inverter is biased to be a linear amplifier by the resistor 15. The resistor 16 controls the amount of feedback in the oscillator which is also controlled by capacitors 17 and 18. The switching logic for this particular configuration is described as follows. The digital circuits use positive logic. In other words, reference to high is a logic level 1 and reference to low is a logic level 0. When the shift high input A and the shift low input B are both driven low, AND gates 21 and 23 are blocked and the LF and HF crystal oscillators 10 and 12 are not fed through to the digital divider 27. The output of NOR gate 24 goes high unblocking AND gate 22. The CF oscillator 11 is fed through gate 22 and through three-input OR gate 25 to the input of digital divider 27. The digital divider 27 is a conventional frequency divider consisting of a number of cascaded D or JK flip-flops.

If the shift high input is driven high and the shift low input is driven low, then gates 22 and 23 are blocked but gate 21 is unblocked allowing only the HF oscillator 12 to be fed through gates 21 and 25 to the input of divider 27.

If the shift high input is driven low and the shift low input is driven high, then gates 21 and 22 are blocked. Gate 23 is unblocked which allows only the LF crystal controlled oscillator 10 to be fed through gates 23 and 25 to the input of divider 27.

Operational amplifiers 31, 32 and 33 along with associated components form the tracking active bandpass filter. The circuit configuration is known as a state variable filter or as a bi-quad filter. Amplifier 31 operates as an inverting amplifier, whereas simplifiers 32 and 33 each operate as an integrator. The resonant frequency of operation is controlled by the time constants of the two integrators 32 and 33. The time constant of integrator 32 is determined by the resistor 34, (between the output of amplifier 31 and the inverting input of integrator 32) and capacitor 35. The time constant of integrator 33 is determined by the resistor 36, (between the output of integrator 32 and the inverting input of integrator 33) and capacitor 37. The resonant frequency of this filter is also determined by the inverting gain of integrator 31. The gain is controlled by resistors 40, 41 and 43. The resistor 40 is a frequency trim control. It has no effect on the output frequency which, of course, is crystal controlled. Its purpose is to bring resonant frequency of the active filter approximately in coincidence with operating frequency, the procedure of adjustment being to peak the amplitude of the output. If the bandpass filter operates with an appropriate Q, a frequency inaccuracy of a few tenths of a percent would have no significant detrimental effect.

The Q of this active filter is controlled by resistors 44 and 45. The output of the digital frequency divider 27 is injected into the bandpass filter through resistor 46. The generator's tone output is taken from the output of amplifier 32 and appears on the lead 47. Resistors 49 and 50 bias the operational amplifiers for linear mode of operation and capacitor 51 by-passes the bias line.

As mentioned above, the frequency of operation is determined by the input resistors to integrators 32 and 33. The bandpass filter operates on its lowest frequency when field effect transistor switches 52, 53, 54 and 55 are turned off. In this case the only input path to the integrators are via resistors 34 and 36.

If switches 52 and 54 are turned on but 53 and 55 remain off, then resistor 56 will be paralleled across resistor 34 and resistor 57 will be paralleled across resistor 36. The resonant frequency of the bandpass filter will be raised.

If switches 52, 53, 54 and 55 are all turned on, then the resistors 56 and 58 will be paralleled across resistor 34 and resistors 57 and 59 will be paralleled across resistor 36. The frequency of the bandpass filter will therefore be further increased.

If the shift inputs are driven to gate the low frequency crystal controlled oscillator through, then the outputs of NOR gate 28 and inverter 29 will both be low. The bandpass filter will be switched to the lowest frequency because switches 52, 53, 54 and 55, will be turned off. If the shift high and shift low inputs are driven to gate the center frequency crystal controlled oscillator through, then the output of gate 28 will be low and the output of inverter 29 will be high. FET switches 52 and 54 will be turned on and 53 and 55 will be turned off. The bandpass filter will be tuned to center frequency. If the shift high and shift low inputs are driven to gate the high frequency crystal controlled oscillator through, then both the outputs of gate 28 and inverter 25 will be high which will turn on FET switches 52, 53, 54 and 55. The bandpass filter will be tuned to the highest tone frequency.

Figure 2:
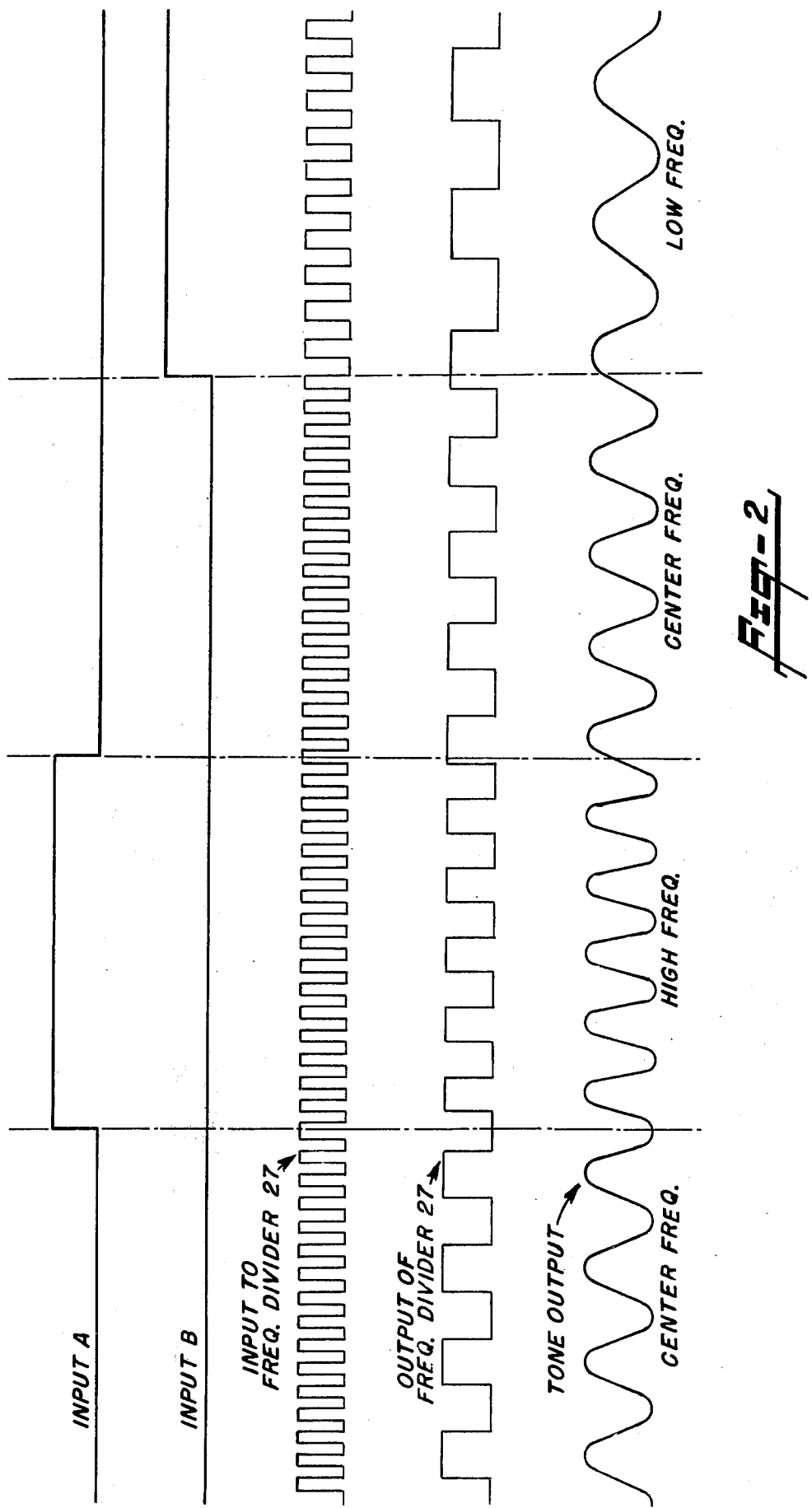
FIG. 2 is a graph showing the waveforms at key points in the circuit.

As mentioned above, the output of the divider is a square wave, see FIG. 2. A square wave, being rich in harmonics, is not suitable for transmission over a telephone line or other voice grade communications circuits. A sinewave of high purity is required and the purer the sinewave, the less the interference to other communications signals sharing the transmission path.

The output of the divider can be followed by a low pass filter or conventional bandpass filter which would pass the fundamental and strip off the harmonics. However, an important feature of my frequency shifted tone generator is that the time delay between when the circuit is commanded to shift frequency and when the output signal actually changes frequency is extremely short. A low pass filter or a bandpass filter would, have, along with the desirable effect of purifying the waveform, the undesirable effect of creating time delay. Any filter having a finite bandwidth gives a time delay and the delay becomes greater as the bandwidth is decreased. A narrow bandwidth with resultant unacceptable time delay is required to achieve the desired sinewave purity.

A feature of this invention is to purify the output of a digitally divided tone frequency originally derived from crystal controlled oscillators, by a narrow bandwidth tracking bandpass filter. A bandpass filter or resonator if selective to only the fundamental tone frequency, will suppress the undesired harmonic frequencies. Thus, the resultant output is a sinewave whose purity is a function of the filter bandwidth. The narrower the bandwidth the higher the rejection.

The basic filter chosen for this particular application is the so-called bi-quad or state variable bandpass filter. This filter, consisting of two operational amplifier integrators and an operational amplifier connected as an inverter, is noted for its low sensitivity to Q or frequency variation versus component value changes. Very high and stable Q's can be developed within the audio frequency range. The filter has the same transfer function as a single L-C resonator. The resonant frequency of this active filter may be instantaneously changed by varying resistors within the circuit. When resistors are varied, there is no change in stored energy as there would be by varying a reactive component. The effect is that when the resistors are changed, the filter is instantaneously shifted from one frequency to another with at that instant no amplitude or phase discontinuity.

The tracking bandpass filter being of high Q acts like a fly wheel. The fly wheel effect is continuously pumped by the tone output of the digital frequency divider. Therefore, the output frequency of the filter will be that of the divider which in turn is crystal controlled. Since the filter is tuned approximately to the tone frequency, its output zero crossings will coincide closely with zero crossings at the output of the digital frequency divider. Suppose as an example, the circuit is commanded to shift frequency but the command is made in time half way between zero crossings of the divider output. The command not only gates on the correct crystal controlled oscillator but changes the frequency of the tracing bandpass filter as well. The energy state of the filter is not changed at that instant, only the rate of change of phase. The tracking active bandpass filter therefore furnishes frequency change information to the communications circuit even though such information, at that instant did not appear at the output of the digital frequency divider. Even though the frequency was changed, the next zero crossing of the divider output and the output of the tracking bandpass filter will coincide because both the divider input frequency and the bandpass filter frequency were correspondingly and simultaneously changed.

Those skilled in this art will be able to make various changes and modifications in the described FSK tone generator. For example, given a particular frequency range for the crystal controlled oscillators, the center frequency need not necessarily be the exact center frequency of the range. It could be any frequency. Also, the digital frequency divider could be a programmable divide-by-N counter and the state variable filter is not the only type of bandpass filter that can be instantaneously tuned. It's just one form of many bandpass filter circuits that are available and that can be switched instantaneously between frequencies. Also, as mentioned above, this circuit can be used for two state binary FSK or as many levels of frequency as are required. This is done simply by cranking in the required number of crystal controlled oscillators and also the required number of FET analog switches and tuning resistors. The analog switches could be any type of electronic switch, i.e., transistor, optically coupled isolator, etc.. Further, it isn't necessary to use a plurality of crystal controlled oscillators. A frequency synthesizer could be utilized, whereby one crystal controlled oscillator could be divided down to the tone frequency by a programmable divide by N frequency counter. Output frequency is changed simply by changing the division integer. The gating logic that changes the integer on the divide by N counter could also be connected to the FET switches in the tracking active bandpass filter. The principle of operation is basically the same as described hereinabove.

Having now described the invention what I desire to protect by letters patent is set forth in the following claims.

I claim:

1. A frequency shift keyed tone generator for providing an output tone frequency in response to an applied control signal, said generator comprising,
   a. a source of crystal controlled oscillations of predetermined frequency,
   b. a digital frequency divider responsive to said oscillations,
   c. tracking active bandpass filter means driven by the output of said divider and providing a sinewave output, and
   d. means controlled by said control signal and simultaneously controlling the output frequency of said divider and the operating frequency of said filter means, the said sine wave output having no phase or amplitude discontinuities when the operating frequency of the said filter means is changed.

2. The invention as recited in claim 1, wherein the said source of oscillations comprises a plurality of individual oscillators operating at different frequencies, and wherein the said means includes gating means connecting said individual oscillators one at a time to said divider.

* * * * *